Spitz

[15] 3,637,307
[45] Jan. 25, 1972

[54] OPTICAL SYSTEM FOR THE READING OUT STORED INFORMATION

[72] Inventor: Erich Spitz, Paris, France
[73] Assignee: Thomson-CSF
[22] Filed: June 18, 1969
[21] Appl. No.: 834,406

[30] Foreign Application Priority Data

June 25, 1968 France...................156457

[52] U.S. Cl. ...................355/40, 95/4.5 R, 350/3.5, 350/167
[51] Int. Cl. ......................................G03b 27/32
[58] Field of Search..................355/40; 95/4.5; 350/167, 3.5

[56] References Cited

UNITED STATES PATENTS

| | | | |
|---|---|---|---|
| 3,084,453 | 4/1963 | Brown | 350/167 X |
| 3,405,614 | 10/1968 | Lin et al. | 350/167 UX |
| 3,504,609 | 4/1970 | Donald | 95/4.5 |
| 3,508,245 | 4/1970 | Purdy et al. | 95/4.5 X |

*Primary Examiner*—Samuel S. Matthews
*Assistant Examiner*—Richard A. Wintercorn
*Attorney*—Cushman, Darby & Cushman

[57] ABSTRACT

The invention relates to optical systems for reading out stored information items carried on a variable transparency support. The information items are juxtaposed on the support and are selectively projected within an aperture by means of holographic imaging means arranged in front of the items; each item can be illuminated by means of a monochromatic beam supplied by a source of light positioned behind said item. The projected images can be either received by photoelectric means or by a photographic film on which they are printed.

12 Claims, 8 Drawing Figures

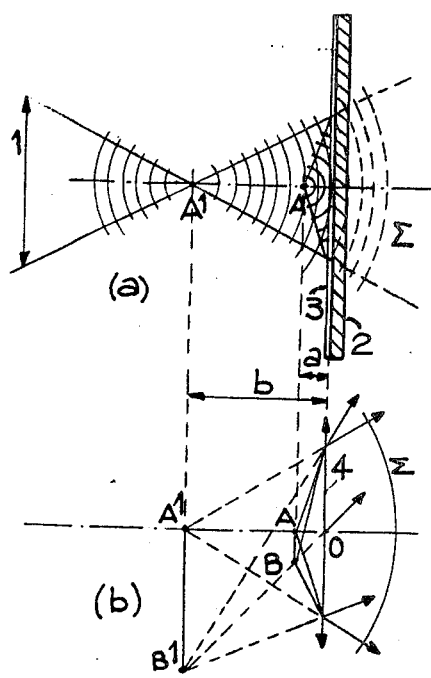
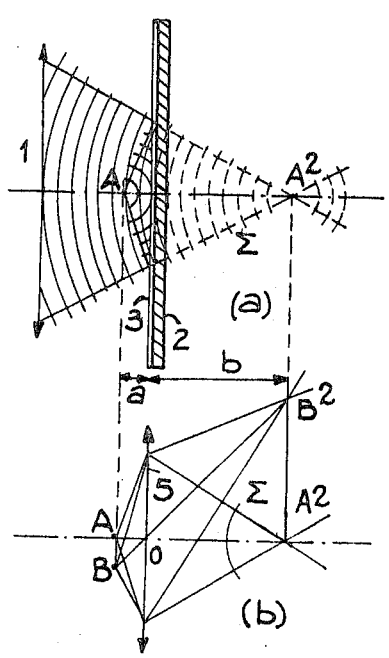
Fig.1
Fig.2

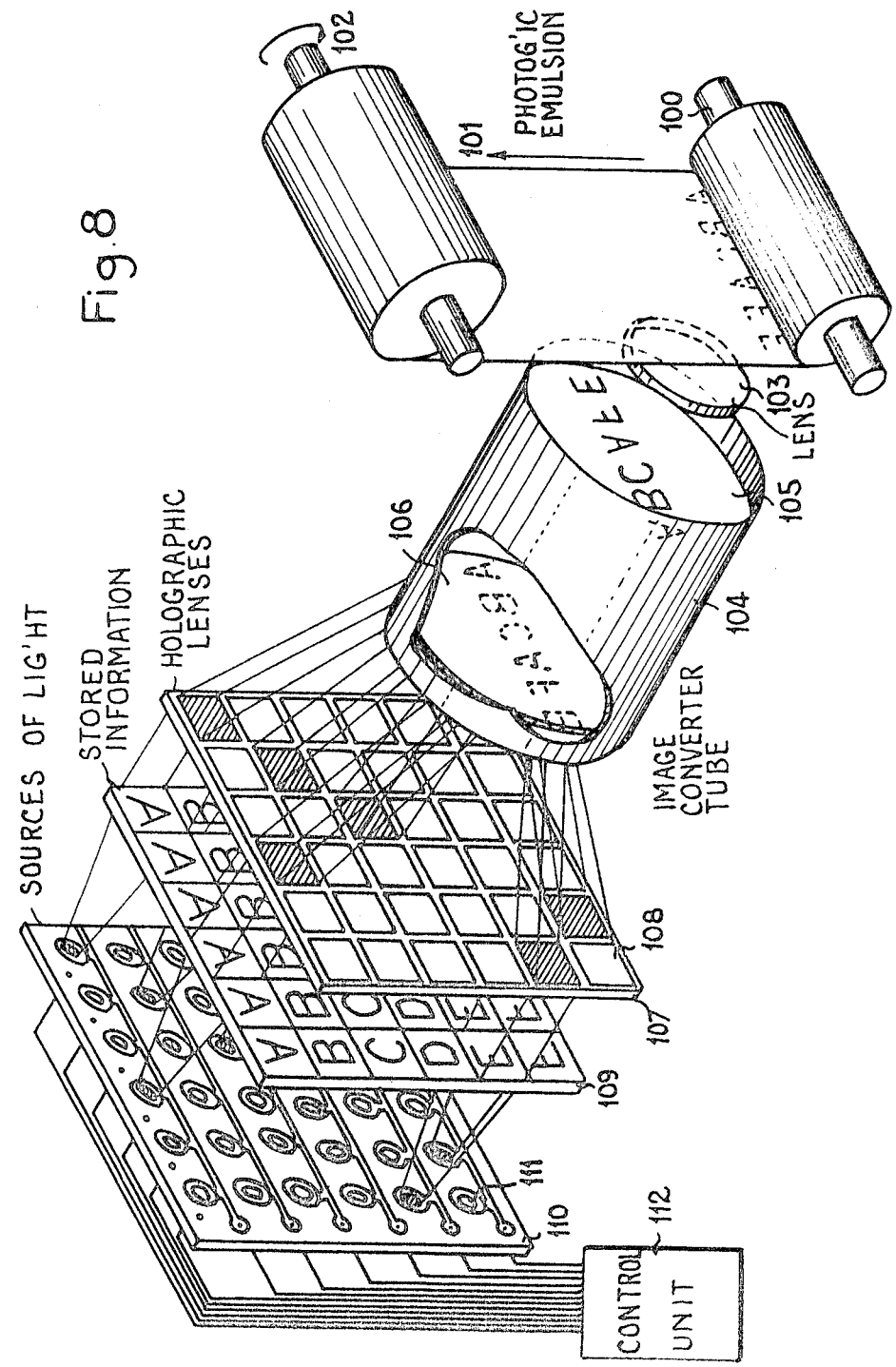

OPTICAL SYSTEM FOR THE READING OUT STORED INFORMATION

The present invention relates to the optical storage of information.

In order to store a very large amount of information within a small bulk, microphotographic procedures, consisting in the formation of microimages on a photosensitive layer, are currently used. After development the photographic document is examined by means of a microscope which allows the reading out to be made on an enlarged scale.

The microphotographic procedure necessitates the use of high quality objectives and requires a very accurate positioning of the microimages in the optical field of the objective.

With a view towards avoiding this inconvenience a holographic process for the optical storage of information has been considered. This process is based on the optical recording of information in the form of fringes produced by the interference of two beams of coherent light.

This technique makes use of expensive sources of light and in addition, it limits the possibilities of storing successive items of information due to the fact that the photosensitive layer reacts quadratically to the amplitude of vibration of light.

It is an object of the invention to avoid such drawbacks.

According to the invention there is provided an optical system for the reading out of N stored information items comprising a support carrying on one face a variable transparency layer representative of said N information items, holographic imaging means positioned for receiving luminous energy emerging from said support and for selectively projecting an enlarged image of any one of said information items upon illumination thereof by a source of monochromatic light; said imaging means comprising N holograms resulting from the interference of coherent point sources of light respectively positioned in the plane of said face and in the plane of said image.

For a better understanding of the invention and to show how the same may be carried into effect, reference will be made to the drawing accompanying the ensuing description and in which:

FIGS. 1 to 3 are explanatory diagrams;

FIG. 8 is a perspective view of a system for printing stored characters on a photographic support under the action of control signals supplied to an electro-optical arrangement.

In FIG. 1a, there is shown an arrangement which permits the construction of a hologram on a transparent support 2, on which a layer of photographic emulsion 3 is applied.

The exposure of the emulsion 3 is effected in monochromatic light, with the aid of two isochronous point sources of light A and $A^1$, located at distances $a$ and $b$ respectively from the emulsion. The interference of the beams of light from sources A and $A^1$ is recorded in the plane of the emulsion and, after development, a pattern of interference fringes is obtained, which forms a hologram. By illuminating the hologram by means of the source A, a light wave $\Sigma$ is diffracted; an observer receiving this wave $\Sigma$ sees, through the hologram, a luminous point $A^1$, exactly as if a lens 1 were causing the light to converge at $A^1$; the hologram is therefore a stigmatic optical system producing a virtual image $A^1$ of the object point A. This stigmatism holds also for these points located in the object and image planes passing through A and $A^1$. It can be seen from FIG. 1b that the hologram behaves as a convergent lens 4, capable of forming a virtual image $A^1 B^1$ of an object A B; the magnification of the stigmatic system is given by the ratio $b/a$.

In FIG. 2a, a holographic arrangement similar to that of FIG. 1, is shown. The hologram recorded differs, however, from the hologram described previously in that the lens 1 causes the light to converge at the point $A^2$ which is located on the other side of the emulsion 3, with respect to point A. When such a hologram is recorded and when it is illuminated by means of source A, it diffracts a wave $\Sigma$, whose energy is concentrated at $A^2$; the point $A^2$ is a real image of the source A.

Figure 3:
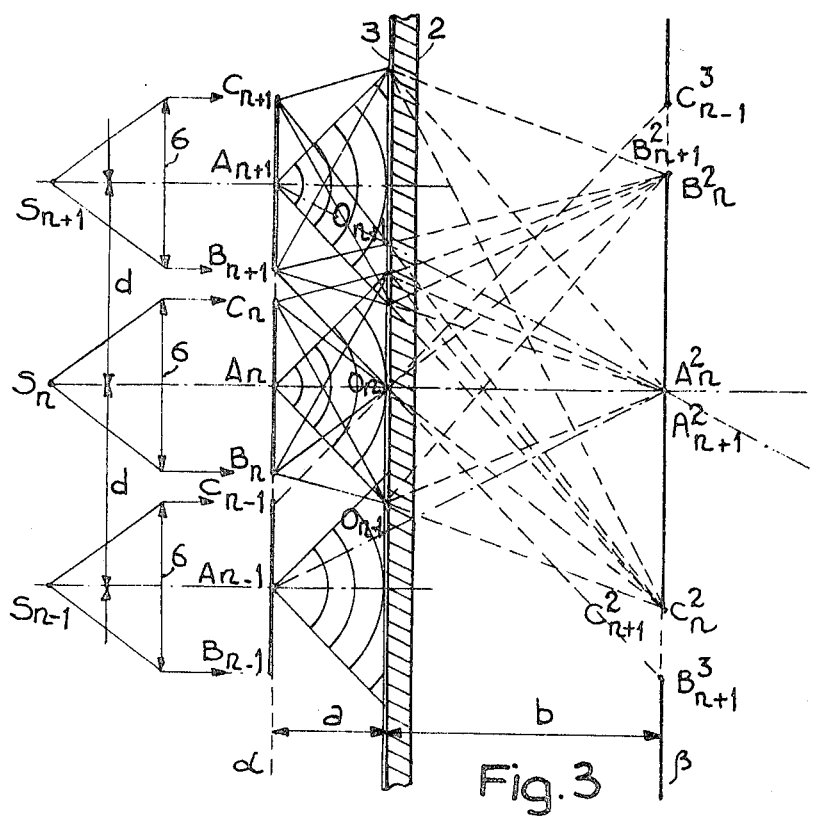

FIG. 3 shows a variation of the holographic arrangement diagrammatically shown in FIG. 2a.

This system differs from the preceding one by the method of forming the hologram. Instead of recording the fringes produced by the interference of a beam converging at $A^2$ and a divergent beam proceeding from A towards the emulsion 3, the fringes caused to be recorded are produced by the interference of a beam converging at $A^2$ with a plurality of divergent beams emitted respectively by discrete point sources $A_{n-1}, A_n, A_{n+1}$. The sources $A_{n-1}, A_n, A_{n+1}$ are located in a plane $\alpha$ at a distance $a$ from the emulsion 3, while the point of convergence $A^2$ is situated in a plane $\beta$ at a distance $b$ from the emulsion 3. After exposure and development of the emulsion 3, a composite hologram is obtained having the capacity to form real images $A^2_{n-1}, A^2_n, A^2_{n+1}$, coincident with the point $A^2$, of each of the luminous points $A_{n-1}, A_n, A_{n+1}$. This stigmatic property applies equally to those points in the plane $\alpha$ which do not coincide with $A_{n-1}, A_n$ and $A_{n+1}$ in this case, real stigmatic images are formed in the plane $\beta$, as through converging lenses with optical poles $O_{n-1}, O_n, O_{n+1}$ were substituted for the hologram. Objects $B_{n-1} C_{n-1}, B_n C_n$ and $B_{n+1} C_{n+1}$ whose transparency is not the same all over the object, are illustrated in the plane $\alpha$, centered respectively about the points $A_{n-1} A_n A_{n+1}$. These objects are illuminated separately by means of light sources $S_{n-1}, S_n, S_{n+1}$ and lenses 6. The luminous energy from the illuminated objects is diffracted by the hologram 3 and forms real images of the said objects in the plane $\beta$; the object $B_n C_n$, in association with the hologram 3, gives rise to a principal image $B^2_n C^2_n$ in the plane $\beta$; the object $B^2_n C^2_n$, separated from the object $B_n C_n$ by the distance $d$, produces a principal image $B^2_{n+1} C^2_{n+1}$ at the exact position of the image $B^2_n C^2_n$; the object $B_{n-1} C_{n-1}$ likewise has its principal image at the position of the image $B^2_n C^2_n$. In addition to the principal images, secondary images are formed in the plane $\beta$; the object $B_n C_n$, for example, has a principal image $B^2_n C^2_n$, surrounded by secondary images $B^3_{n-1} C^3_{n-1}$ and $B^3_{n+1} C^3_{n+1}$ due to the proximity of the objects $B_{n+1} C_{n-1}$ and $B_{n+1} C_{n+1}$ these secondary images in no way hinder the discernment of the principal images.

Figure 4:
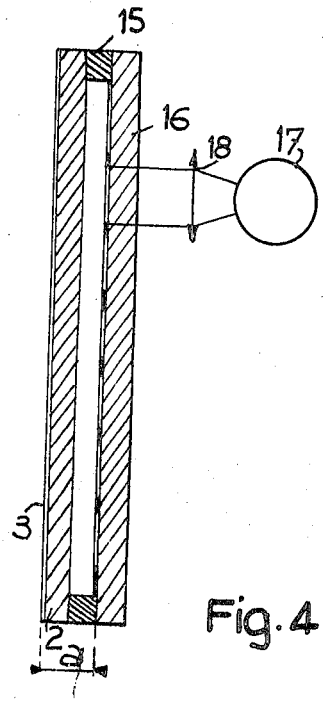
FIG. 4 is a sectional view of a storage and readout system according to the invention.

FIG. 4 shows an example of the optical arrangement for the storing and reproduction of information in accordance with the invention.

It comprises a transparent object holder 16 on one face of which flat objects or microphotographs are distributed. A source of monochromatic light 17, in conjunction with a lens 18, illuminates these objects one by one. A hologram 3 of the type above described is placed at a distance $a$ from the objects so that these latter are situated in the object plane $\alpha$; the support 2 of the hologram 3 is rigidly attached to the support 16 by means of blocks 15. When the beam of light proceeding from the lens 18 illuminates one of the objects arranged on the support 16, the hologram 3 forms a real or a virtual magnified image of it; according to whether the hologram 3 is of the type shown in FIG. 2 or in FIG. 1. This image can be displayed upon a screen or viewed directly in the region opposite the source 17.

The device shown in FIG. 4 does not need any focusing since the hologram 3 is made of a plurality of holographic lenses integral with the object holder 16; the hologram 3 forms a particularly inexpensive multiple objective; the definition of the images obtained is good, since the aperture of the holographic stigmatic system which takes part in the formation of the images is larger than that which would be available if juxtaposed lenses were employed; in addition, local deterioration of the hologram does not prevent the complete formation of images. Of course if a sheet of thickness $a$ is employed as the transparent support, it is possible to form the hologram 3 on one of its faces and to arrange the objects or the microphotographs upon the other face; this monolithic structure is still more simple than the structure shown in FIG. 4. As to the illumination of the objects, the use of a stigmatic system in association with microphotographs allows the image which it is desired to reconstruct to be selected easily, and allows a source of monochromatic light to be used, whose beam is not spatially coherent.

Figure 6:
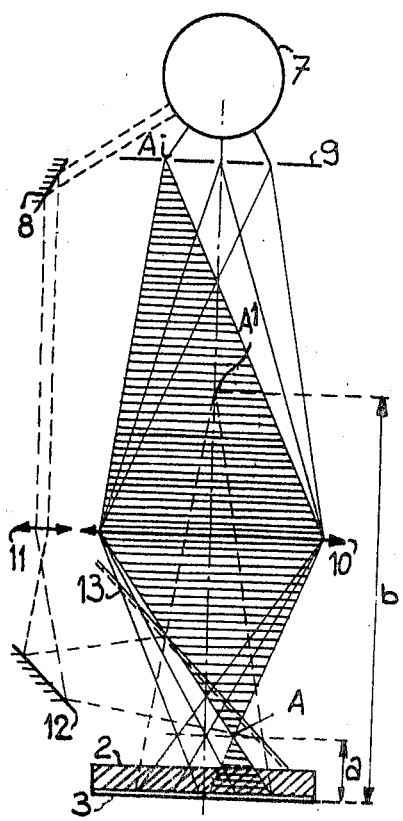
FIGS. 5 and 6 represent diagrammatically optical arrangements for building up the holographic lenses employed in the systems in accordance with the invention.
Figure 5:
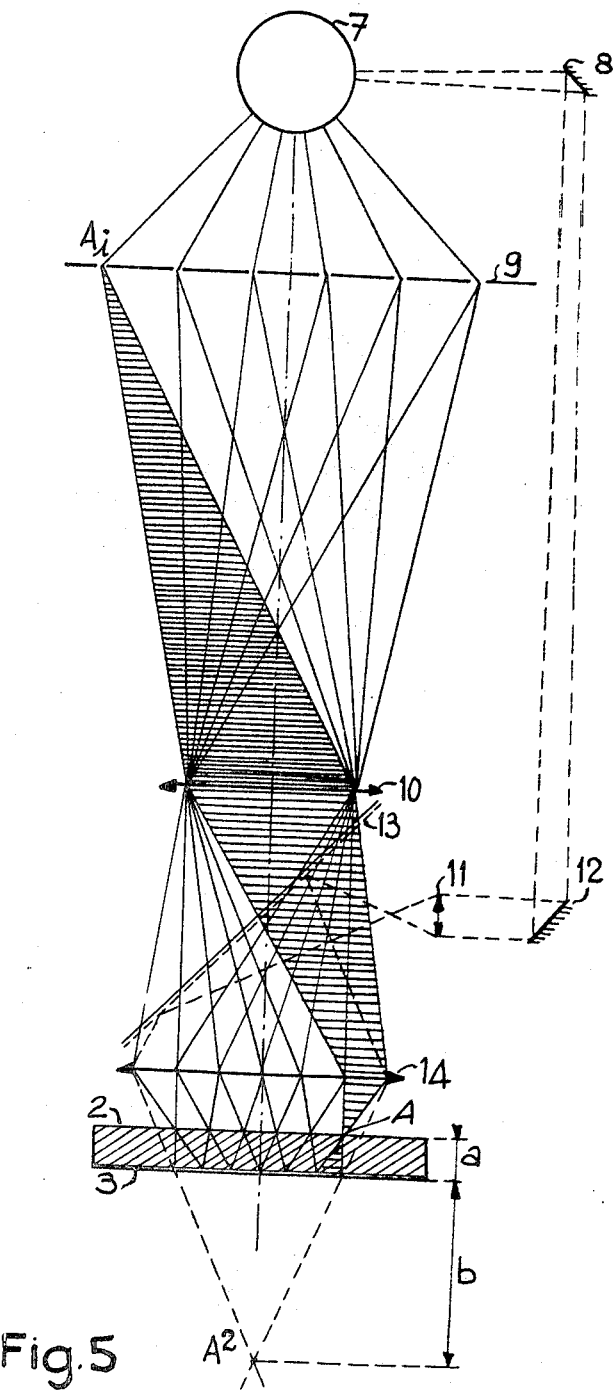

For the construction of the holographic lenses in accordance with the invention, either of the optical devices diagrammatically shown in FIGS. 5 and 6 can be used. The device shown in FIG. 5 enables a photographic emulsion 3, deposited upon a transparent support 2, to be exposed; the device comprises a source of coherent monochromatic light 7, a perforated mask 9, two converging lenses 10 and 14 which form the image of the mask 9 at a distance $a$ from the emulsion 3, and a semitransparent mirror 13 which receives a beam of light proceeding from the source 7 through the intermediary of a lens 11 and mirrors 8 and 12. A perforation $A_i$, formed in the mask 9, forms a point source of light whose rays pass through the lenses 10 and 14 and the mirror 13, up to the point of convergence A; the light bundle between $A_i$ and A is shown in FIG. 5 by the hatched zone which extends up to the emulsion 3; similar bundles of light proceed from the other perforations in the mask 9 and reach the emulsion 3 in the same manner. The light reflected by the mirror 13 passes through the lens 14 and converges at the point $A^2$ as shown in broken line. The divergent beams proceeding from the points A located at a distance $a$ from the emulsion 3 interfere with the beam which converges at $A^2$ at a distance $b$ from the same emulsion; this latter thus records a pattern of interference fringes which, after processing, forms the desired hologram. This hologram yields a real image $A^2$ of a luminous point A.

FIG. 6 shows the same components as FIG. 5, with the exception of the lens 14; the arrangement shown differs from that of FIG. 5, in that the beam of light reflected by the mirror 13 is divergent and appears to proceed from a point $A^1$ located above the emulsion 3 at a distance $b$. A hologram constructed in accordance with the diagram in FIG. 6 is capable of providing a virtual image of a luminous object located at a distance $a$.

The arrangements shown in FIGS. 5 and 6 require a relatively long exposure time by reason of the restricted amount of light which is allowed to pass by the perforations formed in the mask 9.

However, by programming a computer with the equation representing the light interference pattern desired, a system of fringes such as is created by the devices described previously can be constructed point by point. This synthetic procedure is both simpler and more rigorous.

Figure 7:
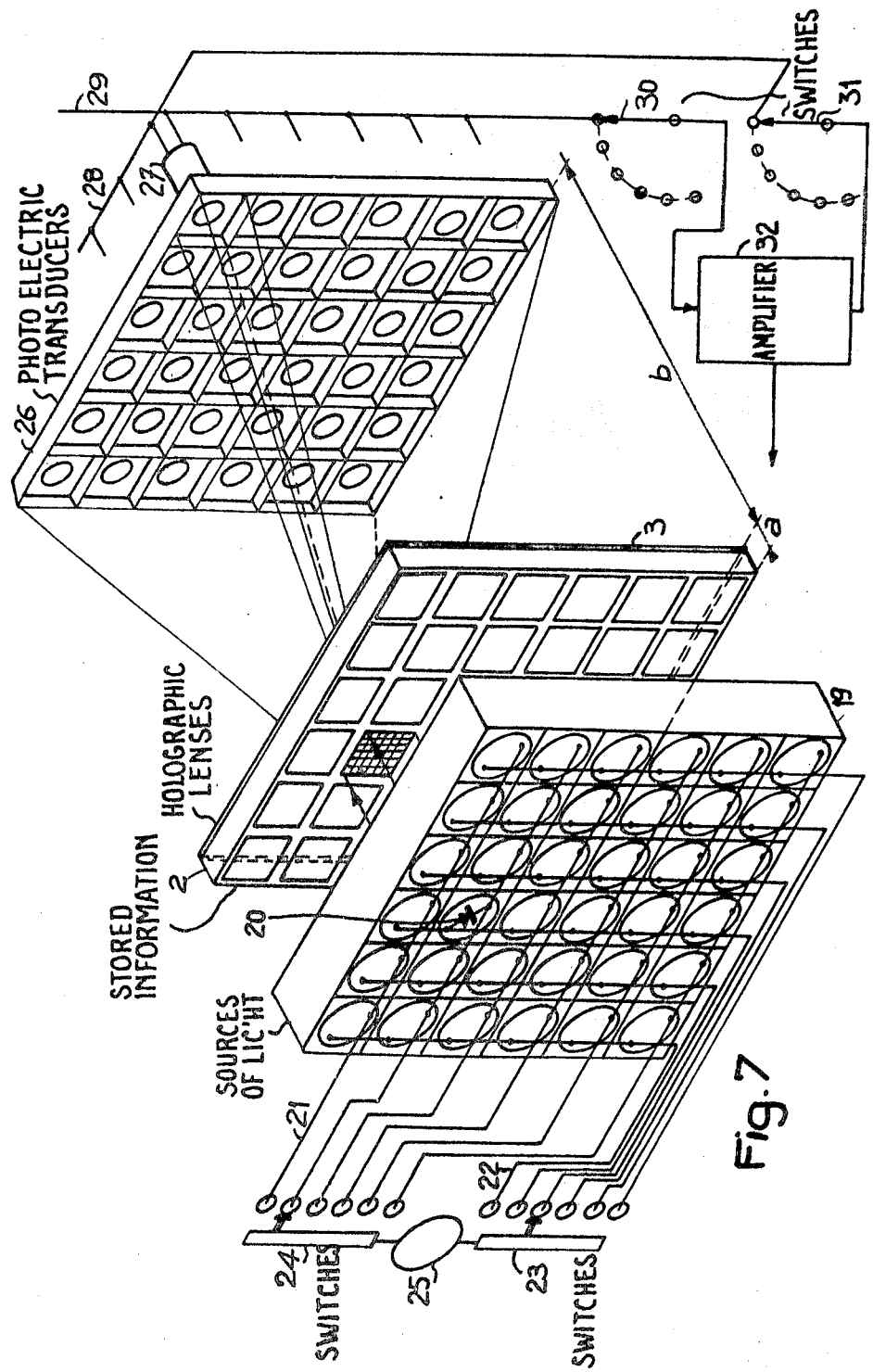
FIG. 7 is a perspective view of a system for reading out stored information equipped with an electrol-optical arrangement allowing the selection of elements of information.

FIG. 7 shows a storage and readout system which allows the elements of optical information to be selected and their state retrieved in the form of electrical signals.

The system comprises a transparent support 2 of thickness $a$ carrying a hologram 3 on one of its faces and an assembly of microphotographs on the other face. By way of example, each of the 36 microphotographs may occupy one sixth of the height and of the width of the support 2. In addition each microphotograph is divided, in its turn, into 36 elementary areas, whose state, according to whether it is opaque or transparent, characterizes a binary element of information. A source of light 19 comprising 36 photoemissive diodes 20, enables each of the microphotographs to be illuminated by beams of monochromatic light; the diodes 20 are connected to the intersections of two sets of conductors 21 and 22; the conductors 21 and 22 terminate at switches 24 and 23 which enable the electrical generator 25 to be connected to the terminals of any one of the diodes 20.

From FIG. 7, it can be seen that the diode 20, shown diagrammatically, illuminates the microphotograph located in the third column of the second row; as a result of this, the hologram 3 projects the real image, magnified 6 times of the said microphotograph onto a readout panel 26 situated at a distance $b$ from the hologram 3. The panel 26 is composed of 36 photoelectric cells 27 whose output terminals are connected respectively to the intersections of two sets of conductors 28 and 29. The conductors 28 and 29 terminate at two switches 30 and 31 which feed the input terminals of an amplifier 32. By combining the positions of the four switches 23, 24, 30 and 31 in all the possible ways, any one of the 1,926 binary optical signals which the support 2 carries can be retrieved; the assembly forms a memory capable of storing a function of four independent variables. By way of nonlimitative example, a support 2, square in shape and of 10 cm. side, can easily contain 10,000 images of 1 mm. side, each of these images can be formed of 10,000 elements, which brings the capacity of the memory to 100 million of binary elements stored.

The extraction of the optical information can be carried out element by element, by giving a specified position to the four switches 23, 24, 30 and 31.

If the photocathode of a camera tube is substituted for the panel 26, a sequence of images giving the impression of movement can be projected upon the said photocathode, by operating the switches 23 and 24; with a rate of projection of 16 images per second, the duration of projection would attain 10 minutes in the case considered.

FIG. 8 shows an arrangement for printing a text by means of characters which are optically stored on a support 109. This arrangement comprises near one face of the support 109 a matrix 110 of monochromatic light sources 111 arranged in rows and columns for respectively illuminating the characters A B C D E F carried by holders 190. Close to the opposite face of the support 109 there is provided a matrix 107 of holographic lenses 108 capable of projecting an image of any one of the above-mentioned characters through a rectangular readout window. This window coincides with the input face 106 of an image converter tube 104 and includes a plurality of juxtaposed frames respectively receiving light from the columns of characters. The output face 105 of tube 104 is optically coupled by means of a lens 103 to a photographic emulsion 101 which is transported from a spool 100 to another spool 102. The electrical energy required for activating sources 111 is supplied by a control unit 112.

Assuming that the line of characters A B C A E is to be printed onto the photographic strip 101, the control unit 112 energizes those sources 111 whose emitting pupils are shaded on FIG. 8.

The upper source 111 located in the right column of matrix 110 illuminate character A which is the upper character in the right column of the support 109; the modulated luminous energy emerging from this illuminated character A is then collected by the upper holographic lens located in the right column of matrix 107 and the latter lens projects an image of character A on the right side of face 106. This image forms another image appearing on the left side of face 105. The light emerging from face 105 is then focused by means of lens 103 for forming an image of character A on the right side of strip 101. The other letters B, C, A, F and E are printed in exactly the same way. It is possible either to print the characters of a line simultaneously or to print them one by one.

The printing arrangement shown in FIG. 8 may be made by assembling a plurality of projection units. Each unit comprises a column of photoemissive diodes 111, a column of characters and a column of holographic lenses 108 forming a sandwich.

The diodes are integrated gallium arsenide semiconductor devices which emit infra red radiant energy at a wavelength of $0.9\mu$. The image converter tube 104 is sensitive to said radiant energy and emits in response thereto light whose wavelength lies in the visible portion of the spectrum.

The diodes 111 are switched on for a duration of 1 microsecond so that a line of 10 characters can be printed in no more than 10 microseconds.

Assuming that the interval of time between the printing of two successive lines is equal to 1 millisecond, it is necessary to provide a transport velocity of strip 101 equal to 2.5 m./sec. to avoid that characters 2 mm. high may overlap. The time elapsed between the printing of two lines can be reduced by increasing to 100 the number of characters per line. By selecting a 35 mm. motion picture film for recording 100 characters per line, it can be seen that a length of 2.5 m. of film will be required for printing within 1 second 1 million characters.

Of course, the image converter tube can be omitted provided that the diodes emit radiant energy capable of darkening the sensitized emulsion; diodes using a compound $A_s$—$G_a$—$P$ as semiconductor material are suitable for this latter purpose.

Of course, the invention is not limited to the embodiments described and shown which were given solely by way of example.

What is claimed is:

1. An optical system for the reading-out of N stored information items comprising: a support carrying on one face a nonuniform transparency layer representative of said N information items, holographic imaging means positioned for receiving luminous energy emerging from said support and for selectively projecting an enlarged image of any one of said information items upon illumination thereof by a source of monochromatic light; said imaging means comprising N holograms resulting from the interference of coherent point sources of light respectively positioned in the plane of said face and in the plane of said image.

2. An optical system as claimed in claim 1, wherein said image is a virtual image.

3. An optical system is claimed in claim 1, wherein said image is a real image.

4. An optical system as claimed in claim 1, further comprising monochromatic illuminating means associated with said support for selectively illuminating any one of said N information items.

5. An optical system in claim 4, for the reading-out of N stored information items comprising: a support carrying on one face a nonuniform transparency layer representative of said N informations items, holographic imaging means positioned for receiving luminous energy emerging from said support and for selectively projecting an enlarged image of any one of said information items upon illumination thereof by a source of monochromatic light, and monochromatic illuminating means associated with said support for selectively illuminating any one of said N information items; said imaging means comprising N holograms resulting from the interference of coherent point sources of light respectively positioned in the plane of said face and in the plane of said image; said illuminating means comprising at least one electroluminescent diode and means for displacing said diode along said support.

6. An optical system for the reading-out of N stored information items comprising: a support carrying on one face a nonuniform transparency layer representative of said N information items, holographic imaging means positioned for receiving luminous energy emerging from said support and for selectively projecting an enlarged image of any one of said information items upon illumination thereof by a source of monochromatic light, and monochromatic illuminating means associated with said support for selectively illuminating any one of said N information items; said imaging means comprising N holograms resulting from the interference of coherent point sources of light respectively positioned in the plane of said face and in the plane of said image; said illuminating means comprising a plurality of electroluminescent diodes arranged in rows and columns and switching means electrically coupled to said diodes for energizing any one of said diodes.

7. An optical system as claimed in claim 6, further comprising photoelectric means positioned for receiving said enlarged image from said imaging means.

8. An optical system as claimed in claim 7, wherein said photoelectric means comprise a plurality of photodiodes arranged in rows and columns and further switching means electrically coupled to said diodes for delivering an electrical signal supplied by any one of said photodiodes.

9. An optical system as claimed in claim 6, wherein said information items comprise a plurality of characters arranged in rows and columns.

10. An optical system as claimed in claim 9, further comprising optical recording means positioned for receiving juxtaposed enlarged images of those characters respectively contained in said columns.

11. An optical system as claimed in claim 10, wherein said optical recording means comprise an exposure slit positioned for receiving said juxtaposed images, a photographic emulsion positioned behind said slit and transport means for displacing said emulsion transversely of said slit.

12. An optical system as claimed in claim 11, further comprising an image converter tube positioned between said imaging means and said photographic emulsion; said image converter tube having an input face positioned for receiving said juxtaposed images and an output face optically coupled to said photographic emulsion through lens means.

* * * * *